(12) United States Patent
Dybing et al.

(10) Patent No.: US 7,192,619 B2
(45) Date of Patent: Mar. 20, 2007

(54) MODIFIED MILK PROTEIN CONCENTRATES AND THEIR USE IN MAKING GELS AND DAIRY PRODUCTS

(75) Inventors: Stephen Thomas Dybing, Harrisburg, PA (US); Ganugapati Vijaya Bhaskar, Palmerston North (NZ); Francis Patrick Dunlop, Palmerston North (NZ); Anthony Michael Fayerman, Palmerston North (NZ); Michael John Whitton, Palmerston North (NZ)

(73) Assignee: New Zealand Dairy Board, Wellington (NZ)

( * ) Notice: Subject to any disclaimer, the term of this patent is extended or adjusted under 35 U.S.C. 154(b) by 556 days.

(21) Appl. No.: 10/122,702

(22) Filed: Apr. 12, 2002

(65) Prior Publication Data
US 2003/0054068 A1 Mar. 20, 2003

(30) Foreign Application Priority Data
Apr. 12, 2001 (NZ) ....................... 511095

(51) Int. Cl.
*A23C 9/00* (2006.01)

(52) U.S. Cl. .............. 426/580; 426/491; 426/582; 426/657

(58) Field of Classification Search ......... 426/491, 426/492, 580, 582, 586, 587, 588, 656, 657
See application file for complete search history.

(56) References Cited

U.S. PATENT DOCUMENTS 2,503,866 A * 4/1950 Chrysler et al. ............ 426/271
5,851,372 A 12/1998 Noel ........................... 204/523
6,183,804 B1 2/2001 Moran et al. ................ 426/582

FOREIGN PATENT DOCUMENTS

| EP | 1363783 | 4/1974 |
|---|---|---|
| EP | 16292 | 1/1980 |
| EP | 0 165 105 | 5/1985 |
| FR | 2 452 879 A | 10/1980 |
| NL | 7810035 | 4/1980 |
| NZ | 211112 | 2/1985 |
| NZ | 233838 | 5/1990 |
| WO | 99/04903 | 2/1999 |
| WO | 01/41578 | 6/2001 |

OTHER PUBLICATIONS

Dunkerley and Zadow, "The Effect of Calcium and Cysteine Hydrochlorine on the Firmness of Heat Coagula formed form Cheddar Whey Protein Concentrates", *The Australian Journal of Dairy Technology*, 44:47 (Mar. 1984).
Creamer et al., "Effect of pH on the texture of Cheddar and Colby cheese", *New Zealand Journal of Dairy Science and Technology* 23:23-25 (1988).
Fox, P.F., "Cheese:Chemistry, Physics and Microbiology" vol. 1, General Aspects 2nd Ed. p. 563, Chapman & Hall, London (1993).
Robinson et al., "Cheesemaking Practice" 3rd Ed. Chapt. 8, pp. 98-105 Aspen Publishers, Gaitherburg (1998).

* cited by examiner

*Primary Examiner*—Leslie Wong
(74) *Attorney, Agent, or Firm*—Knobbe, Martens, Olson & Bear, LLP

(57) ABSTRACT

The method of the invention produces modified milk protein concentrates using cation exchange to replace divalent ions with monovalent ions. The modified milk protein concentrate produced may be converted into a gel which may be a cheese-like product itself, or used to make end products such as cheeses, cheese-like products, savory products, desserts, confectionary products and intermediate food products.

21 Claims, 1 Drawing Sheet

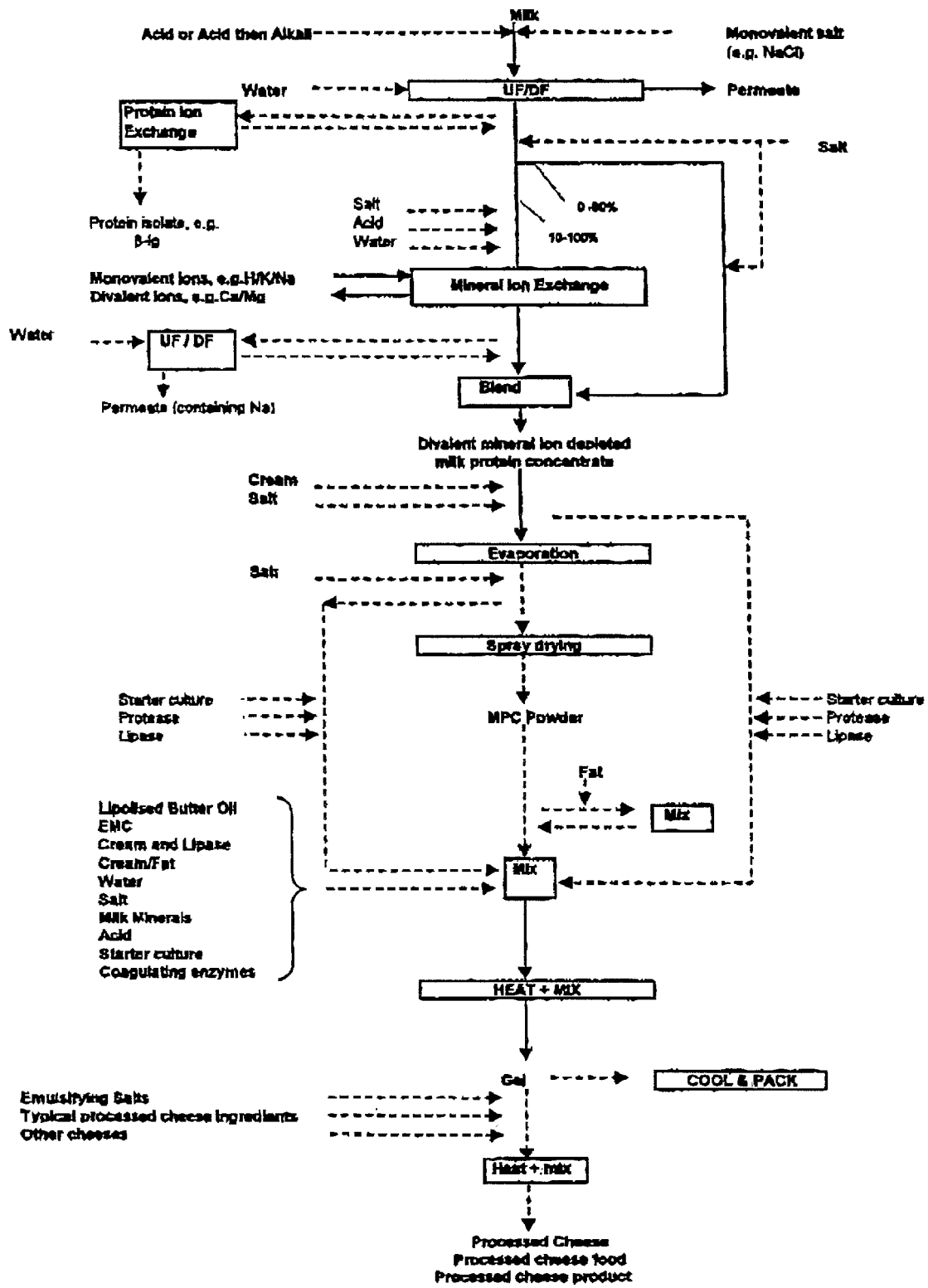

MODIFIED MILK PROTEIN CONCENTRATES AND THEIR USE IN MAKING GELS AND DAIRY PRODUCTS

TECHNICAL FIELD

This invention relates to the production of cation-modified milk protein concentrates (MPCs) having reduced calcium content using a cation exchanger. It also relates to the use of such MPCs in making edible gels. Finally it relates to the use of such gels to make cheeses, cheese-like products, savoury products, desserts, confectionary products and intermediate food products.

BACKGROUND ART

Cheesemakers skilled in their art are able to vary the cheesemaking parameters to adjust widely the composition, texture and organoleptic properties of natural cheese types long available in different parts of the world. Traditional natural cheese can be categorised as a food gel consisting of a hydrated protein matrix in which fat particles are distributed. In cheese, the protein matrix consists mainly of hydrated casein and its reaction products, completed with minerals consisting chiefly of a variety of calcium phosphate salts. Apart from gross composition (fat, protein, water and salt concentrations), the major variables the cheesemaker can manipulate to give a range of textures are the chemical treatment conditions in the vat, eg rennet concentration, time, temperature, ionic concentration and pH. These variables influence the rate and extent of the expulsion of whey from the curd particles during the syneresis process. During syneresis, minerals are expelled from the curd particles along with the other constituents of whey. One of the major minerals influencing cheese curd texture is calcium[1,2]. The calcium content of a variety of traditional cheese types is given by Fox[3].

[1] Robinson R K & Wilbey R A. Cheesemaking 3$^{rd}$ ed. Chapt. 8, Aspen Publishers, Gaithersburg. 1998.
[2] Creamer L, Gilles J & Lawrence R C. Effect of pH on the texture of Cheddar and Colby cheese, New Zealand Journal of Dairy Science and Technology, 23, 23–35 (1988).
[3] Fox P F. Cheese: Chemistry, Physics and Microbiology. Vol. 1. General Aspects, 2$^{nd}$ ed. p. 563. Chapman & Hall, London, 1993.

In non-traditional cheese making, the calcium content of the product can be manipulated by a variety of processes that have been revealed previously. See Moran et al (U.S. Pat. No. 6,183,804) as a recent example, who teaches that the calcium content of MPC can be adjusted (ie lowered) by acidification of the milk prior to ultrafiltration. Also taught is that in addition, if desired, sodium chloride can be added to the milk prior to ultrafiltration in order to lower the calcium content. Using these techniques, there is a practical limit to the proportion of the calcium that can be removed during the ultrafiltration of milk because of factors such as protein precipitation[4], retentate viscosity and limits to the extent of diafiltration. Additionally, ultrafiltration flux rates may be hindered[5] and contamination of the permeate by the added salt or acid can reduce its value. Typically the practical removal limit using membrane techniques on a commercial plant would be about 20% of the calcium. Throughout the description of the present invention, calcium is used as the reference mineral for comparing divalent cations in the modified process streams and products. It should be noted that levels of other minerals, eg magnesium, will also be modified.

[4] See Walstra P. On the stability of casein micelles, Journal of Dairy Science 73, 1965–1979 (1999)
[5] See Eckner K F & Zattola E A. Modelling flux of skim milk as a function of pH, acidulant and temperature. Journal of Dairy Science. 75, 2952–2958 (1992) and also Ernstrom C A, Sutherland B J & Jameson G W. Cheese base for processing. A high yield product from whole milk by ultrafiltration. Journal of Dairy Science. 63, 228–234 (1980)

Arnaud et al (European patent application EP 16292) teaches that essentially 100% of the calcium can be removed from milk and milk products using treatment with cation exchange resin when charged with monovalent cations.

A further method of removing calcium from casein micelles is to chemically bind it using edible sequestering agents such as phosphate or citrate salts. Such agents are known in the art of converting natural cheese into process cheese, process cheese spreads and such products. Such agents are known as "melting salts". Calcium chelation, using such agents as EDTA in the modification of the solubility characteristics of MPC, was taught by Blazey et al in WO 01/41578.

Arnaud et al (European patent application EP 16292) discloses that cheese treated by cation exchange can be converted into process cheese spread without the need to use melting salts.

We have discovered that by using cation exchange resin treatment and restricting the extent of calcium removal, that there is a range of intermediate calcium concentrations greater than those used in the processes taught by Moran et al and less than the concentrations taught by Arnaud et al that creates the opportunity to produce a range of novel protein gels, cheese and cheese-like products without the use of coagulating enzymes, eg rennet, melting salts or gums.

It is an object of this invention to achieve this desideratum or at least to offer the public a useful choice.

In the only example given in the EP 16292 specification, there is nearly complete calcium removal from the "dairy product" precursor, Cheddar cheese, before the dairy product (process cheese) was prepared. There is no indication or suggestion that the inventors made any attempt to limit the calcium removal to a predetermined level. There is no suggestion that by controlling the level of calcium ions removed, it is possible to produce MPCs suitable for use in making food gels or cheese like gel products with predetermined properties.

DISCLOSURE OF THE INVENTION

Accordingly the invention may be said broadly to consist in a method for producing a modified MPC suitable for producing a gel which comprises:

subjecting an aqueous solution of unmodified MPC to cation exchange using a food approved cation exchanger containing monovalent cations to obtain a predetermined amount of substitution of monovalent cations for divalent cations in said modified MPC and recovering said modified MPC.

In one alternative the method includes the steps of dewatering and drying said modified MPC into a powder.

In one embodiment said aqueous solution of unmodified MPC is divided into two process streams, the first of which is subjected to said cation exchange, the second of which is combined with said first stream after said first stream has been subjected to said ion exchange to produce a stream of said modified MPC.

Preferably the calcium content of the said modified MPC is depleted to be 20 to 80% of the calcium content of unmodified MPC.

More preferably the calcium content is depleted to be 40 to 60% of the calcium content of unmodified MPC.

Alternatively the calcium content is depleted to be 25 to 45% of the calcium content of unmodified MPC.

In a particularly preferred embodiment the calcium content is depleted to be 50% of the calcium content of the unmodified MPC.

In one embodiment said method includes the additional step of heating said modified MPC to a temperature of from 35 to 95° C. and maintaining said temperature until a gel is formed, and recovering said gel therefrom.

Preferably said modified MPC is heated to a temperature of from 50° to 90° C.

In another embodiment dairy product making ingredients are added to said modified MPC before said gel is formed.

In another embodiment dairy product making ingredients are added during said gel formation process.

In another embodiment dairy product making ingredients are added to said gel after it has been formed.

In one alternative said unmodified MPC is produced from a skim milk ultrafiltration retentate.

In another alternative said unmodified MPC is produced from a whole milk ultrafiltration retentate.

Preferably said ultrafiltration is continued until said unmodified MPC contains at least 20% total solids.

Preferably said ion exchange is conducted at a pH of 4.5 to 8.0.

Preferably said ion exchange is conducted in an ion exchange column and said column is loaded with food approved cation exchange resin charged with potassium or sodium ions.

Most preferably said resin is charged with sodium ions.

In one alternative cheese making ingredients are added to said modified MPC before heating to form said gel.

In one alternative said modified MPC is concentrated by membrane filtration after said ion exchange step.

In one alternative said solution containing unmodified MPC is subject to protein ion exchange prior to being subjected to cation exchange.

In one embodiment the invention consists in a modified MPC powder prepared by the above methods.

In another embodiment the invention consists in a gel derived from said modified MPC prepared by the above methods.

In one alternative said gel is a food product able to act as an ingredient in a further food product.

In another alternative said gel has the chemical and physical characteristics of cheese.

In another alternative said gel can be further processed into processed cheese or into a process cheese type product.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

The invention may be more fully understood by having reference to FIG. 1, which is a flow diagram of a process according to the invention. FIG. 1 illustrates the steps required to produce liquid or dried modified MPCs and the formulation and processing steps required for the production of a wide range of food gets ready for consumption, eg natural cheese-like products, desserts, meat analogues, etc, based on these modified MPCs.

MODES OF CARRYING OUT THE INVENTION

Preparation of Modified MPCs

Referring to FIG. 1 the preferred starting material is milk. More particularly, the fat content of whole milk is adjusted as desired using separation to remove fat as cream, or by using standardization to reduce or enrich the fat content by adding the appropriate cream or skim milk products. Separation and/or standardization can produce a starting material ranging from skim milk to fat enriched whole milk. A more preferred starting material is either skim milk with 0.06 to 0.08% fat or whole milk. The milk is pasteurized and cooled as required using standard procedures. If necessary, the size of the fat globules in the milk can be reduced by homogenization.

Numerous filtration procedures can be used to remove desired portions of the water, lactose, milk salts, and (optionally) some or all of the whey proteins from the milk to create the desired MPC solution. Continuous membrane filtration is the preferred method of fractionating the milk components. The prepared milk, more preferably, is fractionated to produce an MPC solution by ultrafiltration (UF) using a suitable membrane system capable of achieving a volume concentration factor (VCF=volume of milk/volume of retentate) of between 2 to 8 times. A preferred UF system is equipped with a membrane capable of retaining compounds with a molecular weight greater than 10,000 to 30,000, that is used to produce a UF retentate with a VCF between 3 to 6 times. Protein concentration may be enhanced during UF by diafiltration (DF); the process of adding water during UF to increase the removal of lactose and dissolved milk salts and reduce retentate viscosity. A suitable UF/DF system will produce retentates with a total solids (TS) content of 14% to 50%. The preferred UF/Dr system produces retentates from skim milk with 14% to 30% TS, and retentates from whole milk with 35% to 45% TS. The preferred UF/DF system should produce UF retentates containing essentially all of the caseins and whey proteins initially present in the milk feed stream. The use of filtration in the manufacture of MPCs is well documented[6,7,8].

[6] Renner E & Abd El-Salam M H. Application of ultrafiltration in the Dairy Industry. (1991) Elsevier Applied Science London, England.
[7] Glover F A. Ultrafiltration and Reverse Osmosis for the Dairy Industry. Technology Bulletin 5 National Institute of Research in Dairying. (1985) Reading, England.
[8] Cheryan & Minir. Ultrafiltration and Microfiltration Handbook. (1998) Technomic Publishing, Lancaster, Pa., USA.

As discussed in the background art section of this document, it is already known that the divalent mineral content of a MPC can be manipulated by adjusting the pH of the milk prior to filtration. The pH of the milk may be adjusted within the range of 3.0 to 9.5 by the addition of edible acid and/or alkali. The extent of pH adjustment promotes the dissolution of the divalent ions in the casein, allowing these minerals to migrate to the milk serum and to be removed from the milk during filtration. A preferred procedure is to reduce the pH of milk at a temperature $\leq 18°$ C. by the addition of edible acids to enhance the dissolution of divalent mineral complexes present in the casein. Alternatively, enhanced removal of the divalent ions may be achieved by adding acid to reduce the milk pH, holding the milk for a defined period of time, and raising the pH by the addition of alkali. A preferred sequence for realizing an enhanced removal of the divalent ions from the casein micelles by pH manipulation includes: (1) reduction of the milk pH, at a temperature of $\leq 15°$ C., to between 4.9 to 5.4 with a food grade organic acid; (2) holding the milk at this temperature with mild agitation for 30 to 45 minutes; (3) adding food grade alkali to increase the pH of the milk to 5.8 to 6.2, and immediately continuing with the desired processing. A more preferred acid for pH adjustment is an edible organic acid, and the most preferred organic acid is lactic acid.

Alternatively, or in addition to acid, edible salts containing monovalent cations optionally may be added to milk prior to filtration. After addition of the monovalent cations the milk is preferably held for 30 minutes with mild agitation prior to UF.

However, all of the above known procedures are limited to a maximum practical level of calcium depletion of only about 20%. These known procedures are also not preferred due to significantly reduced flux rates through some filtration membranes at reduced pH and the formation of acidic and/or salt permeates. The above known methods of reducing the divalent cation level in an MPC solution can be used as a preliminary step before carrying out the process according to the invention.

For the purposes of this specification the percentage calcium depletion is referenced to the mmoles of calcium per kg of total protein typically found in equivalent MPC solutions produced by the filtration of milk at the typical pH of fresh milk, ie 6.6 to 6.8.

Although the process described with reference to FIG. 1 contemplates the formation of MPC from fresh milk and immediately processing that retentate in an ion exchange column, it is equally possible to make up an aqueous protein solution by reconstituting a dried MPC for further processing according to this invention.

In the process according to the invention, the mineral content of the MPC solution is modified by processing from 10 to 100% of the MPC solution in an ion exchange reactor containing the appropriately charged resin. A preferred ion exchange reactor contains a cation exchange resin charged with monovalent cations such as hydrogen ($H^+$) potassium ($K^+$), or sodium ($Na^+$) ions. More preferably, the cation exchange resin will be charged with sodium ions for effecting exchange and removal of the desired quantity of divalent cations, particularly $Ca^{+2}$ and $Mg^{+2}$ from the MPC solution.

In the case where 100% of the MPC solution is passed through the ion exchange resin, the calcium removal is preferably limited to no less than 20% and no more than 80% of the calcium in the original MPC solution. The preferred procedure for achieving the target calcium depletion level is to ion exchange part of the MPC solution and then blend this with MPC solution not treated by ion exchange. Preferably, >10% but <100% of the original MPC solution is treated by ion exchange to remove 20 to 95% of the calcium in the ion exchanged MPC solution, which will be replaced preferably with sodium. More preferably, cation exchange will remove 60 to 85% of the calcium in the ion exchanged MPC solution, which will be replaced preferably with sodium. The ion exchanged MPC solution is then blended with MPC solution that has not been treated by ion exchange to produce a blend with a calcium depletion level no less than 20% and no more than 80% of the calcium in the original MPC solution.

The design of the ion exchange reactor and the amount of ion exchange resin used should promote a suitably rapid reaction rate for the exchange of divalent cations with monovalent cations. The amount of calcium ions removed from the MPC solution is controlled by the selection of the appropriate resin, the MPC concentration, the viscosity in the ion exchange column and the processing conditions within the ion exchange column. Such conditions include residence time, pH, temperature, volume of liquid, volume of resin, exchange capacity and breakthrough characteristics of the resin bed. The operation of the ion exchange process can be performed by those skilled in the art[9,10,11].

[9] Perry. Chemical Engineers Handbook. Sixth edition, Chapter 16.
[10] Vermeulen T & LeVan D. Adsorption and Ion Exchange. McGraw Hill (1984)
[11] Nachod F C & Schubest J. Ion Exchange Technology. Academic Press, New York, (1956).

A preferred MPC solution added to the ion exchange reactor contains about 10% total solids. The pH is adjusted to about 5.9 prior to ion exchange by addition of a suitable food grade acid, to reduce the fluid viscosity in the ion exchange column. A preferred ion exchange resin is food approved Amberlite SR1L Na. Preferably the ion exchange is conducted at a temperature of 2 to 60° C. Higher temperatures reduce the fluid viscosity in the ion exchange vessel but 10° C. is preferred to control the growth of microbiological organisms.

Preferably, in the blended MPC stream, calcium is depleted by >20% but <80%. The level of calcium depletion in the MPC is selected based on the desired physical and chemical characteristics of the final product and the gel forming process, e.g. the required rates of MPC powder hydration, emulsification and gelation. This range of calcium depletion achieved by this invention is greater than the calcium depletion levels achievable practically by the known methods of acid or salt addition prior to filtration and lower than the calcium depletion levels taught by Arnaud in EPA16292.

For creating a Cheddar cheese-like gel, about 25% to about 60% of a skim MPC solution is treated by ion exchange to remove about 80% to about 90% of the calcium. This treated solution is combined with an MPC solution that has not been subjected to ion exchange to produce the target calcium depletion level of about 25% to about 45% in the blend. The examples in this specification illustrate a range of other end product applications produced from a range of modified MPCs.

The MPC solution may optionally be passed through a separate ion exchange system to modify the protein content in addition to mineral ion exchange. Preferably, the ion exchange system for modifying proteins is performed in sequence before ion exchange to modify the mineral content. More preferably, the ion exchange system used to modify the protein content of the concentrated protein solution will contain a resin capable of removing β-Lactoglobulin (β-Lg). Such an ion exchange system preferably would therefore produce an MPC solution from which β-Lg and similar proteins have been removed in whole or in part, prior to the subsequent use of ion exchange for modification of the mineral content.

Additionally, concentration of the protein solution optionally may be continued after the use of ion exchange to further modify the mineral and possibly the protein content of the MPC. Preferably, a combination of UF and DF is used to concentrate the protein stream and reduce its monovalent cation content per kg of total protein.

Preferably, if salts are to be added to the MPC, salts with monovalent cations are added to the MPC solution after filtration. Preferably, sodium chloride and/or potassium chloride are added to the concentrated protein solution at a level of about 0.05 to 2.5%.

Optionally, further concentration of the MPC solution can be accomplished by standard procedures, including evaporation. Methods of evaporation include, but are not limited to the use of falling film, tubular, and swept surface (wiped film) evaporators. Evaporation of the modified MPC solution continues up to a total solids (TS) level of about 25% to about 75%. The fat content of the MPC solution, following mineral adjustment or following evaporation, may be adjusted as desired by the addition of cream having a suitable fat content. The salt content of the modified MPC solution may also be adjusted by the addition of sodium chloride and/or potassium chloride as desired, either before or after evaporation. The concentrated modified MPC solution can be used directly in the formulation and formation of food gels as described below.

Alternatively, the concentrated modified MPC solution can optionally be dried to a powder. Methods of drying include, but are not limited to the use of spray, fluidized bed, and freeze dryers. The preferred TS of the product after drying is about 95%. The dried modified MPC powder is shelf stable and can be packaged and stored until needed to complete gel formation/cheese manufacture at a latter date, possibly in a different location. Optionally, further processing can begin when desired to convert the powder into the desired food gel.

Formation of Food Gels from Modified MPCs

Optionally, concentrated modified MPC solutions, dried modified MPC powders or a combination of modified MPC solutions and modified MPC powders can be combined with a suitable fat source. Suitable fat sources include cream, plastic cream, butter, anhydrous milk fat, clarified butter, and edible oils. The most preferred sources of fat are plastic cream (a dairy product containing approximately 80% milk fat), butter, and/or anhydrous milk fat. An optional procedure when using dried modified MPC powder, is to blend the modified MPC powder into the fat with sufficient agitation to produce a homogenous, paste-like product.

Gel formation can be induced in the aforementioned mixture by heating, indirectly via a heating jacket or directly by the addition of culinary steam, from about 35° C. to about 95° C. Preferably, gel formation for the production of any cheese variety, including but not limited to Cheddar cheese, is induced at temperatures between about 35° C. and about 75° C. The level of agitation is selected to produce a food gel, which on cooling has the desired body, texture, fat globule size and melt characteristics. Optionally, shear rates may be varied during the gelation process.

No coagulating enzymes, eg rennet, melting salts or gums are required to form these gels, but these ingredients can be added to manipulate the texture of the gels if required. The food gels can, if desired, be further processed, eg the cheese-like food gels can be processed using standard processed cheese manufacturing techniques to produce processed cheese-like products.

In a series of experiments, we discovered that for a given food gel product there is an optimum range of calcium depletion levels for the production of useful gels. A series of modified MPC powders with a range of calcium concentrations was prepared according to the procedure given in example 1. This series included powders prepared from skim milk as well as whole milk. The series also included a pair of skim milk and whole milk reference MPC powders that were not subject to the ion exchange calcium depletion procedure. In the experiments conducted in a Blentech cooker described in example 3, the ability of these powders to produce a gel with the nominal composition of Cheddar cheese (35% moisture) was examined. The results of the properties of the gels produced from these two series of powders are summarised in Table 1. A combination of acceptable and unacceptable gels was produced. These results were sorted according to the level of calcium (kg Ca/kg protein) in the MPC and the results are arranged in Table 2.

Table 2 shows that there was a preferred range of calcium concentration for the production of acceptable gels with the nominal composition of Cheddar cheese, which was independent of the initial milk source (skim milk or whole milk).

The results shown in Table 2 leads us to the conclusion that for the application of preparing a Cheddar cheese-like product, calcium depletion levels less than about 25% give poor MPC powder hydration and a useful gel did not form with heating. Furthermore, at high calcium depletion levels greater than about 70%, we find that an unacceptable combination of poor fat dispersability and poor gel formation on heating occurs.

In a further series of experiments, the examples in this specification illustrate how different MPC powders (with 70 and 85% protein on a dry basis) and different calcium depletion levels can be used to produce a wide range of dairy food gels.

TABLE 1

Preparation of Cheddar cheese-like gels from calcium depleted MPCs in Blentech twin screw cooker.

| Class of Powder | Calcium Content[1] | Calcium Depletion[2] (%) | Powder Hydration and Dispersion | Fat Incorporation | Gel Formation |
|---|---|---|---|---|---|
| High fat MPC70 | 784 | 0 | Lumps | Acceptable | Paste |
| | 582 | 26 | Lumps | Acceptable | Paste |
| | 564 | 28 | Dispersed | Acceptable | Gel |
| | 315 | 60 | Dispersed | Free fat | Separate protein phase |
| | 14 | 98 | Lumps | Free fat | Separate protein phase |
| Skim MPC70 | 784 | 0 | Lumps | Acceptable | Paste |
| | 512 | 35 | Dispersed | Good | Gel |
| | 460 | 41 | Dispersed | Good | Gel |
| | 406 | 48 | Dispersed | Free fat | Gel[3] |
| | 235 | 70 | Dispersed | Free fat | Separate protein phase |
| | 14 | 98 | Dispersed | Free fat | Separate protein phase |

[1]Calculated as mmol calcium/kg total protein
[2]Percentage calcium removed by ion exchange
[3]Borderline gel formation

TABLE 2

Preparation of Cheddar cheese-like gels from calcium depleted MPCs in Blentech twin screw cooker.

| Calcium Content[1] | Calcium Depletion[2] (%) | Powder Hydration and dispersion | Fat Incorporation | Gel Formation | | |
|---|---|---|---|---|---|---|
| 784 | 0 | Lumps | Acceptable | Paste | | |
| 582 | 26 | Lumps | Acceptable | Paste | | |
| 564 | 28 | Dispersed | Acceptable | Gel | ↑ | |
| 512 | 35 | Dispersed | Good | Gel | \| | Acceptable |
| 460 | 41 | Dispersed | Good | Gel | \| | range |
| 406 | 48 | Dispersed | Free fat | Gel[3] | ↓ | |
| 315 | 60 | Dispersed | Free fat | Separate protein phase | | |
| 235 | 70 | Dispersed | Free fat | Separate protein phase | | |
| 14 | 98 | Dispersed | Free fat | Separate protein phase | | |

[1]Calculated as mmol calcium/kg total protein
[4]Percentage calcium removed by ion exchange
[5]Borderline gel formation Other suitable ingredients can be added to the protein-fat mixture in the processing vessel as needed before, during or after the gelation process to produce the completed food gel. Ingredients that can be added include, but are not limited to additional protein solutions or powders, protein solutions or powders following mineral adjustment by ion exchange, protein solutions or powders following fermentation with suitable starter culture microorganisms and/or flavor producing enzymes, water, animal and/or vegetable fats and/or oils, salts, milk minerals, enzyme modified cheese, flavors, flavour producing enzymes and cultures, lipolyzed butter oil, food gums and/or hydrocolloids, colours, preservatives, flow agents, edible acid(s), etc. Coagulating enzymes, eg rennet, are not essential to the gelation process. In addition, melting salts typically used in processed cheese manufacture, for example bat not limited to sodium phosphate salts as known in the art, are not required to achieve gel formation.

By selection of formulation variables such as protein, fat and water levels, calcium depletion level in the modified MPC, salt concentration and pH, and process variables such as temperature, shear rate and residence time, the physical and chemical properties of the cooled gelled product can be controlled. Preferably, the gelled product will have similar chemical and physical properties to natural cheese and can therefore be packaged and marketed as natural cheese.

Alternatively, the gelled product can be used as an ingredient for further processing. For example, cheese-like gels can be further processed, following the addition of melting salts, such as but not limited to sodium phosphate salts known in the art, and using standard processed cheese manufacturing equipment and techniques to produce process cheese-like products. Cheese-like gel products can be converted to processed cheese-like products immediately after the formation of the cheese-like gel. Alternatively, the cheese-like gel products can be stored under typical natural cheese storage conditions until required for the manufacture of processed cheese-like products.

Use of the cheese-like gel products for the production of process cheese-type products involves the addition of the standard processed cheese ingredients including, but not limited to natural cheese, fat, cream, acid(s), salt, melting salts, flavors, food gums or hydrocolloids, enzyme modified cheese and fat products for flavor, color(s), preservative(s), flow agent(s), etc. The product is heated to a typical processing temperature (i.e. >80° C.) with appropriate agitation, packaged as desired, and handled as is standard for the manufacture of process cheese-type products.

EXAMPLES OF THE INVENTION

Example 1

Preparation of Modified MPC Powders of this Invention

Fresh whole milk was received and cream was removed by separation at ≦5° C. to produce skim milk. The skim milk was pasteurised by standard procedures, cooled to 10° C., and processed by UF to a VCF of 3 in a system containing Koch™ S4 HFK 131 type membranes with a molecular weight cut off of 10,000. Diafiltration was then applied and continued until the protein content of the MPC solution constituted 85% of the total solids. A portion of the MPC solution was introduced into an ion exchange column containing food approved AMBERLITE™ SRILNa, a strong acid cation exchange resin, with a total exchange capacity of 2 equivalents/L of sodium.

Approximately 70 L of sodium charged resin was loaded into the 140-liter stainless steel vessel, creating a resin bed height of 55 cm. The MPC solution was treated in the ion exchange column at a flow rate of 133 kg/hr, and collected in a storage vessel. On completion of the ion exchange treatment the liquid in the storage vessel had a calcium depletion level of 85%.

A sufficient quantity of the modified MPC solution was combined with untreated MPC solution to produce a modified MPC blend with 378 mmol of calcium/kg of total protein, ie approximately 33% calcium depleted compared to the untreated MPC85 solution. The blended modified MPC solution was evaporated and dried by standard procedures to produce a milk protein concentrate powder with the following composition: 95.6% TS, (4.4% moisture), 2.3% fat, 82.46% protein (% N×6.38), 3.74% lactose, 7.1% ash and 378 mmol Ca/kg protein The modified MPC was packaged in industry standard packaging materials, and held at ambient temperatures until used for gel manufacture.

Modified MPC powders with defined protein and calcium depletion levels are manufactured using the same basic process by simply varying the degree of UF/DF and varying the mix ratio of ion exchanged and non-ion exchanged MPC solutions.

Example 2

Comparison of the Gelation Characteristics of Modified MPCs of this Invention with MPCs Manufactured by the Process Implied by Arnaud in EP16292.

Manufacture of Arnaud Powders

Whole milk was received and cream removed by separation to produce skim milk. Approximately 1150 L of the skim milk was filtered by UF at 10° C. (using Koch HFK 131 membranes with a molecular weight cut off of 10,000), using a VCF of 4.0, to produce an MPG solution. This MPC solution was diluted with deionised water to reduce the total solids content to ~10%, and then adjusted to pH 5.9 using 3% lactic acid before treatment in an ion exchange column containing 150 L of cation exchange resin (Rohm and Haas AMBERLITE™ SR1L Na) charged with sodium ions.

Approximately 85 kg of the cream at 55° C. was adjusted to pH 5.9 with 3% lactic acid and passed through a Pharmacia ion exchange column containing ~5 L of food grade cation exchange resin (Rohm and Haas AMBERLITE™ SR1L Na) charged with sodium ions.

Table 3 shows the composition of the cream and MPC solution after cation exchange, as determined by MILKO-SCAN™ FT120 and titration. Thus, essentially all of the calcium, ie >98%, was removed from the MPC solution and the cream by these ion exchange processes, (in accordance with the teaching of Arnaud in EP 16292).

TABLE 3

Composition of cream and MPC solution following cation exchange in accordance with Arnaud in EP16292.

| Milk Fraction | Fat (% w/w) | Protein (% w/w) | TS (% w/w) | SNF (% w/w) | Calcium (mmol/kg protein) | % calcium depletion |
|---|---|---|---|---|---|---|
| Treated cream | 39.47 | 1.98 | 44.44 | 5.14 | None detected | 100 |
| Treated MPC | 0.32 | 6.00 | 8.77 | 8.45 | 13.3 | 98.3 |

The pH of a 290 liter portion of the treated MPC solution was adjusted to about pH 6.4, and evaporated and dried by standard procedures to produce MPC70 powder essentially free of calcium as taught by Arnaud in EP16292. The remaining treated MPC solution (240 L) was blended with 32 kg of the calcium free cream, and adjusted to about pH 6.4 and then evaporated and dried to produce an high fat MPC powder containing about 70% protein on a solids non fat basis. This high fat powder was also essentially free of calcium as taught by Arnaud in EP16292.

Table 4 shows the compositions of the these two "Arnaud" powders and compares them with:

The starting Cheddar cheese used in Arnaud's example 2 (EP 16292).

The Cheddar cheese after ion exchange from Arnaud's example 2 (EP16292),

A commercially produced MPC 70 powder (ALAPRO™ 4700, NZMP, Wellington).

A modified MPC70 powder with a 48% reduction in calcium content as described in the present invention.

TABLE 4

Composition of "Arnaud" MPC powders compared to the Cheddar cheeses used in Arnaud's example 2, a commercial MPC powder and the MPC powder of this invention.

| Product | Fat (% w/w) | Protein (% w/w) | Moisture (% w/w) | Calcium (mg/kg) | Calcium (mmol/kg protein) | % calcium depletion |
|---|---|---|---|---|---|---|
| Starting Cheddar (EP16292) | 34.2 | 24.9[12] | 36.7 | 9,200 | 922 | 0 |
| Partially defatted Ion exchanged Cheddar cheese (EP16292) | 29.5 | 26.4[13] | 38.9 | 360 | 34 | 96.3 |
| ALAPRO ™ 4700 | 1.4 | 70 | 4.4 | 22,000 | 784 | 0 |
| "Arnaud" high fat MPC powder | 35.3 | 43.8 | 1.8 | 246 | 14.0 | 98.2 |
| "Arnaud" MPC70 powder | 1.0 | 67.2 | 2.9 | 375 | 13.9 | 98.2 |
| Modified MPC70 powder of this invention | 2.2 | 68.8 | 4.3 | 11,200 | 406 | 48.2 |

Comparison of the gelling behaviour of "Arnaud" MPCs with the modified MPC of this invention.

Gelation experiments were performed with a FARINO-GRAPH™ blender (Model 820500, Brabender, Duisburg, Germany) using a 280 g batch size. The FARINOGRAPH™ blender consists of a water jacketed mixing chamber agitated by two counter-rotating Z-blades. One of blades rotates at twice the speed of the other. The two speed settings, for the slowest rotating blade, are 31.5 or 63 rpm, (thus the faster blade rotates at 63 or 126 rpm). The torque on the agitator drive shaft was measured by load cell.

Three experiments were conducted using the three powders manufactured as described above. Each powder was blended with appropriate quantities of deionised water, plastic cream (79%) and sodium chloride to produce a target product composition similar to Cheddar cheese, ie 35% fat, 34% moisture and 22% protein. The three powders used were:
- a Modified MPC70 powder of this invention with 48% calcium depletion,
- "Arnaud" MPC70 powder, with >98% calcium depletion.
- "Arnaud" high fat MPC powder (70% protein on a solids no fat basis), with >98% calcium depletion.

1) Gelation Experiment Using the MPC70 Powder of this Invention: The FARINOGRAPH™ blender was preheated to 40° C. and 120 g of high fat cream was added to the mixing chamber with the slower Z-blade rotating at 31.5 rpm. 89 g of the modified MPC70 powder and 3 g of sodium chloride were added to the cream. Mixing continued for 5 minutes and as the fat melted, a crumbly yellow paste-like mixture was formed. Then, 68 g of deionised water (preheated to 40° C.) was added to the mixture. Agitation continued for a further 17 minutes, producing a smooth, opaque yellow mixture with complete fat incorporation The mixture was then gradually heated via the water jacket to 60° C. over 12 minutes and over this period the torque on the agitator shaft was measured. The torque after 5 minutes began to increase from ~0.80 Nm and reached a maximum value of 2.2 Nm at ~10 minutes. This torque response reflects the visual observation that the mixture had transformed into a firm gel during the process. When cooled to about 5° C., the body and texture of this gel was equivalent to the body and texture of Cheddar cheese.

2) Gel Experiment Using the "Arnaud" MPC70: The FARINOGRAPH™ blender was preheated to 40° C. and 120 g of high fat cream was added to the mixing chamber with the slowest Z-blade rotating at 31.5 rpm. 89 g of the "Arnaud" MPC70 powder was added to the cream. Sodium chloride was not required as the "Arnaud" MPC powder had a higher sodium level than the MPC produced by this invention. Mixing continued for 5 minutes, producing a crumbly, yellow paste with a slight amount of free fat. 68 g of water (preheated to 40° C.) was then added and the mixture and stirring continued for a further 2 minutes. On addition of the water, the fat dispersion immediately broke to produce a sticky mass of hydrated protein and a large amount of free fat. In an attempt to re-establish the fat dispersion the agitation was continued for over 30 minutes but this proved unsuccessful. The two phases, consisting of hydrated protein and free fat, were gradually heated together to 60° C. over 12 minutes and over this period the torque on the agitator shaft was measured. At no point of the process did the torque register greater than 0 Nm reflecting the observation that the protein phase was stuck to the agitator blades which were simply rotating in a pool of molten fat. At no stage was a fat dispersion or a gel formed.

In a further attempt to redisperse the fat and form a gel, the mixture was heated to 80° C. and then 90° C. This again failed to induce emulsification or gelation, even after mixing with an augur speed of 63 rpm for over 30 minutes.

3) Gelation Experiment Using "Arnaud" High Fat MPC Powder: The FARINOGRAPH™ blender was preheated to 40° C. and 55 g of high fat cream placed in the mixing chamber with the slowest Z-blade rotating at 31.5 rpm. 44 g of the "Arnaud" high fat MPC powder was added to the cream. Mixing continued for 5 minutes and produced a crumbly yellow paste with a slight amount of free fat. Then, 78 g of water (preheated to 40° C.) was added and mixing continued for a further 2 minutes. The fat dispersion broke on addition of the water, creating separate phases consisting of a sticky mass of hydrated protein and free fat. Prolonged stirring failed to produce a fat dispersion. The product was gradually heated to 60° C. over 12 minutes and over this period the torque on the agitator shaft was measured. The mixture failed to produce a fat dispersion or a gel. In an attempt to form a fat dispersion, the temperature was increased to 80° C., but even stirring at 63 rpm for over 30 minutes failed to produce a fat dispersion or a gel. At no point did the torque register greater than 0 Nm reflecting the observation that the protein phase was stuck to the agitator blades which were simply rotating in a pool of molten fat.

Conclusions from Gelation Experiments

The MPC70 powder produced by the process of this invention readily emulsifies fat and forms a firm gel with relatively low shear and at relatively low temperatures.

The "Arnaud" MPC powders, essentially free of calcium, were unable to create or maintain an acceptable fat emulsion on the addition of the water and did not form a visible or measurable gel. Treating these powders with prolonged high shear and temperatures also did not promote fat dispersion or gel formation to emulsify the fat or to form a gel.

Example 3

Preparation of Cheddar-like Cheese

Pasteurized whole milk was adjusted to a temperature of 50° C. and concentrated by ultrafiltration to a VCF of 4.65, using a UF/DF system containing membranes with a 10,000 molecular weight cutoff. After filtration, 1.225 kg of MPC solution, at 50° C., was added to a twin screw, process cheese cooker with a capacity of 5 kg (Model CC10, Blentech Corporation, Rohnert Park, Calif.). The rotational speed of the twin screws was set to 50 rpm and 57 g of sodium chloride added. The product was mixed for about 2 minutes and 1.35 kg of plastic cream (80% fat) at ≈8° C. was added to the mixture. The agitation fully incorporated the plastic cream into the mixture within 2 minutes. When the plastic cream was filly blended into the mixture, 0.8 kg of the modified MPC85 powder (produced by the procedure detailed in example 1, to have a protein content of 85% on a dry basis and a calcium content of 378 mmol/kg total protein, ie 33% deplete) and 125 g of lactose monohydrate were added to the mixture. The agitation speed was increased to 240 rpm and the ingredients mixed for ten minutes, while maintaining the product temperature at approximately 50° C. The agitation speed was then decreased to 160 rpm and the product temperature increased by direct steam injection to 63° C., producing a gel.

On formation of the gel, 30 g of milk mineral salt (ALAMIN™, NZMP (USA), Inc., Lemoyne, Pa.) was added to ensure that the resulting gel had an equivalent nutritional mineral profile to traditional Cheddar cheese. The mixture was then agitated for 1 minute at 220 rpm to uniformly distribute the ALAMIN in the product. The product was then packaged in a block format, and the gel stored at 4° C. for 24 hours.

The cooled gel was equivalent to a young cheese with the composition, body and texture of Cheddar cheese. The compositions of ingredients and the product are shown in Table 5.

TABLE 5

| Component | MPC 85 | UF Retenate % | Young Cheese |
|---|---|---|---|
| Moisture | 4.40 | 62.08 | 36.12 |
| Total Solids | 95.60 | 37.92 | 63.88 |
| Fat | 2.30 | 17.39 | 33.74 |
| Total Protein | 82.46 | 15.77 | 21.71 |
| Lactose | 3.74 | 3.08 | 4.59 |
| Ash | 7.10 | 1.68 | 3.84 |

Table 1 summarises the gelation characteristics of a range of MPC powders (all containing 70% protein on a dry basis) manufactured according to the process detailed in example 1.

Example 4

Preparation of Process Cheese 3.59 kg of the cheese gel prior to packaging and cooling from example 3 was used as the starting point of this process. The following ingredients were then added to the gel in the Blentech mixer/cooker: 30 g water, 70 g disodium phosphate, 23 g trisodium phosphate, 100 g butter, 350 g of enzyme modified cheese, 25 g of lactose monohydrate, and 42 g of sodium chloride. The mixture was heated by direct steam injection to 85° C. and then held for one minute at an agitation speed of 180 rpm. The product was then discharged from the cooker into moulds and stored at <5° C., The composition of the finished product was: moisture=39.3%, TS=60.7%. fat=30.6%, protein=18.8%, lactose monohydrate=5.3% and ash=6.0%. The body and texture of the product was equivalent to commercial block process cheese.

Example 5

Preparation of a Dairy Dessert

The production of a dairy dessert was initiated by blending 2.7 kg of high fat cream (78% fat) at 50° C., 1.0 kg of modified MPC70 (produced by the procedure detailed in example 1, to have a protein content of 70% on a dry basis and a calcium content of 406 mmol/kg total protein, ie 48.2% deplete), 500 g of lactose monohydrate and 2.85 kg of water in a Stephan mixer/cooker (Type UMM ISK25-GNI, Stephan, Hameln, Germany). Blending commenced with the high-speed cutting blades at 1500 rpm and the wall scraper at 60 rpm. The mixture was blended for 1 minute before heating was initiated. The temperature of the mixture was then raised to 85° C. by direct steam injection, taking just over 3 minutes. After heating, 1.5 kg of water and 30 g of crystalline citric acid were added to the hot mixture. The mixture was blended for a further 1 minute. The hot product was then poured into 0.25 liter plastic pots and stored at 5° C. The cooled product gelled to produce a texture typical of a dairy dessert. The product had a body that was slightly stiffer than a typical custard and had a smooth and shiny appearance. The finished product composition was 62.3% moisture (37.7% TS), 21.9% fat, 7.9% protein, and a pH of 5.8.

Example 6

Preparation of a Spreadable Dairy Product

A dairy spread was prepared by combining 5.8 kg of high fat cream (78% fat) at 50° C., 1.0 kg of modified MPC70 powder (produced by the procedure detailed in example 1, to have a protein content of 70% on a dry basis and a calcium content of 406 mmol/kg total protein, ie 48% calcium depleted), 0.85 kg of water, 184 g of enzyme modified cheese, 150 g of sodium chloride, and 150 g of lactose monohydrate in the Stephan mixer/cooker used in example 5. The mixture was blended for 1 minute with the cutting blades at 1500 rpm and the wall scraper at 60 rpm. The temperature of the mixture was then raised to 85° C. by direct steam injection, taking just over 3 minutes. After heating, 24 g of crystalline citric acid was added and the mixture was blended for a further 1 minute. The hot product was poured into 0.25 liter plastic pots and stored at 5° C., The body and texture of the chilled product was typical of a pasteurised process cheese spread. The finished product composition was: 51.1% moisture, 29.6% fat, 11% protein, and a pH of 5.7.

Example 7

Preparation of a Meat Analogue

The production of a dairy-based meat analogue began with the addition of 2.15 kg of high fat cream (78% fat) at 50° C., 2.65 kg of modified MPC70 powder (produced by the procedure detailed in example 1, to have a protein content of 70% on a dry basis and a calcium content of 406 mmol/kg total protein, ie 48% calcium depleted), 2.65 kg of water, and 150 g of sodium chloride to the Stephan mixer/cooker used in examples 5 and 6. The mixture was blended for 1 minute with the cutting blades at 1500 rpm and the wall scraper at 60 rpm. The temperature of the mixture was then raised to 85° C. by direct steam injection, taking just over 3 minutes. The cooked mixture was blended for a further 1 minute before adding 1.5 kg of water and 40 g of crystalline citric acid. The mixture was blended for 2 more minutes before the hot product was poured into 0.25 liter plastic pots. The pots were allowed to cool slowly at ambient temperature for 16 hours before being placed into storage at 5° C. The body and texture of the chilled product were typical of a luncheon meat prepared as a sausage. Generally, the product maintained a grainy texture, sliced well, and did not melt. The product composition was: 55.6% moisture, 16.5% fat, 20.1% protein, and a pH of 5.9.

Example 8

Preparation of Cream Cheese

The manufacture of cream cheese began with the addition of 1.23 kg of modified MPC85 powder (produced by the procedure detailed in example 1, to have a protein content of 85% on a dry basis and a calcium content of 406 mmol/kg total protein, ie 48% calcium depleted), 3.53 kg of water (40° C.) and 80 g of sodium chloride to the Stephan mixer/cooker used in the previous examples. The mixture was blended for 1 minute with the cutting blades at 1500 rpm and the wall scraper at 60 rpm. The high-speed agitation was then stopped while the wall scraper remained operating at 60 rpm for a further 33 minutes. This procedure transformed the mixture into a thick paste. The mixture was combined with 4.96 kg of high fat cream (78% fat). With the cutting blades turned back on to 1500 rpm, the temperature of the mixture was raised to 85° C. by direct steam injection, taking just over 3 minutes. The hot mixture was then blended for a further 1 minute, 595 g of 12.8% lactic acid was then added over about 5 minutes. The mixture was then blended for a further 1 minute. The hot product was poured into 0.25 liter plastic pots and stored at 5° C. The chilled product had the body, texture, and composition of a typical commercial cream cheese. The composition of the product was: 54.4% moisture, 33.2% fat, 9.8% protein, and a pH of 5.2.

Example 9

Preparation of Edam Cheese

The production of Edam cheese was initiated by blending 0.97 kg of high fat cream (78% fat) and 0.94 kg of modified MPC85 (produced by the procedure detailed in example 1, to have a protein content of 85% on a dry basis and a calcium content of 291 mmol/kg total protein, ie 48.8% calcium depleted), in the Blentech twin screw mixer/cooker used in example 3. The mixture was blended at 120 rpm for 3 minutes at about 40° C. Then 56 g of sodium chloride was added, the mixture blended for another 2 minutes, and finally 0.69 kg of water was added gradually. The mixture was blended for a further 20 minutes, then 20 g of crystalline citric acid was added and the mixture blended for another 4 minutes. The mixture was heated by direct steam injection to 70° C. over 7 minutes. Blending continued for a further 3 minutes. During this time 60 g of water and 3 g of crystalline citric acid were added, while the temperature was maintained at 70° C. by direct steam injection. The hot product was packed into plastic containers and stored at 5° C. The chilled product had a texture and composition typical of an Edam cheese. The product composition was: 43.6% moisture, 25.0% fat, 44.3% fat on a dry basis, 25.1% protein, and a pH of 5,6.

Example 10

Preparation of Pasta Filata Cheese

Pasta filata cheese was produced by blending 0.95 kg of high fat cream (78% fat), 0.96 kg of modified MPC85 (produced by the procedure detailed in example 1, to have a protein content of 85% on a dry basis and a calcium content of 291 mmol/kg total protein, ie 48.8% calcium depleted) and 45 g of sodium chloride to the Blentech twin screw mixer/cooker used in previous examples. The mixture was blended at 120 rpm and about 40° C. for 5 minutes before 1.0 kg of water was slowly added. Blending continued for a further 24 minutes, then the mixture was supplemented with 65 g of 42% lactic acid. Blending continued for another 4 minutes. Then the temperature of the mixture was increased to 70° C. over 7 minutes by direct steam injection. At the start of the heating step, the augur speed was increased to 150 rpm. The hot product was mixed for a further 1 minute before being packed into plastic containers and stored at 5° C. The chilled product bad a texture typical of pasta filata. The composition of the product was: 48.3% moisture, 22% fat, 23.5% protein, and a pH of 5.7.

The invention claimed is:

1. A method for producing a modified milk protein concentrate (MPC) suitable for producing a gel which comprises:
    subjecting an aqueous solution of unmodified MPC to cation exchange using a food approved cation exchanger containing monovalent cations to obtain a predetermined amount of substitution of monovalent cations for divalent cations in said modified MPC and recovering said modified MPC, wherein the calcium content of said modified MPC is depleted to be 20 to 85% of the calcium content of the unmodified MPC.

2. A method according to claim 1 which includes the steps dewatering and drying said modified MPG into a powder.

3. A method according to claim 1 wherein said aqueous solution of unmodified MPG is divided into two process streams, the first of which is subjected to said cation exchange, the second of which is combined with said first stream after said first stream has been subjected to said ion exchange to produce a stream of said modified MPC.

4. A method according to claim 2 wherein said aqueous solution of unmodified MPC is divided into two process streams, the first of which is subjected to said cation exchange, the second of which is combined with said first stream after said first stream has been subjected to said ion exchange to produce a stream of said modified MPC.

5. A method according claim 1 wherein said calcium content of the said modified MPC is depleted to be from 40 to 60% of the calcium content of said unmodified MPC.

6. A method according to claim 1 wherein the calcium content of said modified MPC is depleted to be from 25 to 45% of the calcium content of said unmodified MPC.

7. A method according to claim 1 wherein the calcium content of said modified MPC is depleted to be 50% of the calcium content of said unmodified MPC.

8. A method according claim 2 which includes the additional step of heating said modified MPC to a temperature of from 25° to 95° C. and maintaining said temperature until a gel is formed, and recovering said gel there from.

9. A method according to claim 8 wherein said modified MPC is heated to a temperature of from 50° to 90° C.

10. A method according to claim 8 wherein dairy product making ingredients are added to said gel after it has been formed.

11. A method according to claim 8 wherein dairy product making ingredients are added to said modified MPC before said gel is formed.

12. A method according to claim 1 wherein said unmodified MPC is produced from a skim milk ultra-filtration retentate.

13. A method according to claim 12 wherein the ultra-filtration is continued until said MPC contains 14 to 45% total solids.

14. A method according to claim 1 wherein said unmodified MPC is produced from a whole milk ultra-filtration retentate.

15. A method according to claim 14 wherein said ultra-filtration is continued until said MPC contains from 20 to 65% total solids.

16. A method according to claim 1 wherein said ion exchange is conducted at a pH of 4.5 to 8.0.

17. A method according to claim 16 wherein said ion exchange is conducted in an ion exchange column and said food approved cation exchanger is charged with potassium or sodium ions.

18. A method according to claim 17 wherein said exchanger is charged with sodium cations.

19. A method according to claim 11 wherein cheese making ingredients are added to said modified MPC before heating to form said gel.

20. A method according to claim 1 wherein said modified MPC is concentrated by membrane filtration after said ion exchange step.

21. A method according to claim 1 wherein said solution containing unmodified MPC is subject to protein ion exchange prior to being subjected to cation exchange.

* * * * *

UNITED STATES PATENT AND TRADEMARK OFFICE
CERTIFICATE OF CORRECTION

PATENT NO. : 7,192,619 B2
APPLICATION NO. : 10/122702
DATED : March 20, 2007
INVENTOR(S) : Dybing et al.

Page 1 of 1

It is certified that error appears in the above-identified patent and that said Letters Patent is hereby corrected as shown below:

At column 1, line 23, please replace "completed" with -- complexed --
At column 3, line 57, please replace "gets" with -- gels --
At column 4, line 28, please replace "UF/Dr" with -- UF/DF --
At column 9, line 37, please replace "bat" with -- but --
At column 11, line 3, please replace "MPG" with -- MPC --
At column 12, line 38, please replace "(EP16292)," with -- (EP16292). --
At column 13, line 16, before "Modified" please delete "a".
At column 13, line 17, please replace "depletion" with -- depletion. --
At column 13, line 32, after "incorporation" please insert -- . --
At column 13, line 50, please replace "filly" with -- fully --
At column 15, line 33, please replace "<5° C.," with -- <5° C. --
At column 16, line 12, please replace "5° C.," with --5° C.--
At column 17, line 51, please replace "bad" with -- had --
Column 18, line 2, please replace "MPG" with -- MPC --
Column 18, line 4, please replace "MPG" with -- MPC --

Signed and Sealed this

Tenth Day of July, 2007

JON W. DUDAS
*Director of the United States Patent and Trademark Office*